United States Patent
Kim et al.

(10) Patent No.: US 11,634,887 B2
(45) Date of Patent: Apr. 25, 2023

(54) METHOD AND SYSTEM FOR CONTROLLING CONSTRUCTION MACHINERY

(71) Applicants: DOOSAN INFRACORE CO., LTD., Incheon (KR); SEOUL NATIONAL UNIVERSITY R&DB FOUNDATION, Seoul (KR)

(72) Inventors: Changmook Kim, Seongnam-si (KR); Dongjun Lee, Seoul (KR); Changu Kim, Seoul (KR); Bukun Son, Seoul (KR)

(73) Assignee: DOOSAN INFRACORE CO., LTD., Incheon (KR)

( * ) Notice: Subject to any disclaimer, the term of this patent is extended or adjusted under 35 U.S.C. 154(b) by 137 days.

(21) Appl. No.: 16/952,599

(22) Filed: Nov. 19, 2020

(65) Prior Publication Data

US 2021/0148085 A1    May 20, 2021

(30) Foreign Application Priority Data

Nov. 19, 2019   (KR) .......................... 10-2019-0148379

(51) Int. Cl.
*E02F 9/20*   (2006.01)
*E02F 9/26*   (2006.01)

(52) U.S. Cl.
CPC ............ *E02F 9/2029* (2013.01); *E02F 9/265* (2013.01)

(58) Field of Classification Search
None
See application file for complete search history.

(56) References Cited

U.S. PATENT DOCUMENTS

| | | | |
|---|---|---|---|
| 2014/0107841 A1* | 4/2014 | Danko | B25J 9/1607 |
| | | | 700/253 |
| 2016/0258128 A1 | 9/2016 | Nakamura et al. | |
| 2020/0024828 A1* | 1/2020 | Asada | E02F 3/437 |
| 2020/0325649 A1* | 10/2020 | Tsukamoto | E02F 9/2278 |
| 2021/0149403 A1* | 5/2021 | Ready-Campbell | |
| | | | G05D 1/0027 |

FOREIGN PATENT DOCUMENTS

| | | |
|---|---|---|
| JP | S62-160325 A | 7/1987 |
| JP | S63-194032 A | 8/1988 |
| KR | 10-2015-0122895 A | 11/2015 |

OTHER PUBLICATIONS

Extended European Search Report dated Apr. 20, 2021, in connection with the counterpart European Patent Application No. EP202008532.0.

(Continued)

*Primary Examiner* — Adam D Tissot
*Assistant Examiner* — Garrett F Evans
(74) *Attorney, Agent, or Firm* — Hauptman Ham, LLP (57) ABSTRACT

In a method of controlling construction machinery, a bucket of a working device is moved along a first excavation trajectory to perform an excavation operation on the ground of a work area. A digging force exerted on the bucket during the excavation operation is calculated. A new second excavation trajectory is generated based on the calculated digging force. The bucket is moved along the second excavation trajectory.

14 Claims, 9 Drawing Sheets

(56) References Cited

OTHER PUBLICATIONS

Auke Jan Ijspeert et al., "Dynamical Movement Primitives: Learning Attractor Models for Motor Behaviors", Massachusetts Institute of Technology, Neural Computation 25, pp. 328-373, 2013.

Tie Zhang et al., "Disturbance Observer-Based Robot End Constant Contact Force-Tracking Control", Hindawi, vol. 2019, Article ID 5802453, 21 pages, Oct. 29, 2019.

* cited by examiner

000000# METHOD AND SYSTEM FOR CONTROLLING CONSTRUCTION MACHINERY

PRIORITY STATEMENT

This application claims priority under 35 U.S.C. § 119 to Korean Patent Application No. 10-2019-0148379, filed on Nov. 19, 2019 in the Korean Intellectual Property Office (KIPO), the contents of which are herein incorporated by reference in their entirety.

BACKGROUND

1. Field

Example embodiments relate to a method and a system for controlling construction machinery. More particularly, example embodiments relate to a method of controlling construction machinery such as an autonomous excavator and a control system for performing the same.

2. Description of the Related Art

An automated excavator system can perform excavation work by itself in a given environment. Unmanned excavators must have capability to generate optimal motion in a reliable and efficient manner. However, because it is possible to recognize terrain through a LiDAR, a radar, etc., but obstacles in the ground cannot be recognized, when performing an excavation operation according to the existing excavation trajectory, excessive pressure may be applied or a bucket may be trapped in the ground.

SUMMARY

Example embodiments provide a control method for construction machinery that performs an automatic excavation function capable of improving fuel economy, durability and work efficiency of the construction machinery.

Example embodiments provide a control system for construction machinery for performing the control method.

According to example embodiments, in a method of controlling construction machinery, a bucket of a working device is moved along a first excavation trajectory to perform an excavation operation on the ground of a work area. A digging force exerted on the bucket during the excavation operation is calculated. A new second excavation trajectory is generated based on the calculated digging force. The bucket is moved along the second excavation trajectory.

In example embodiments, calculating a digging force exerted on the bucket may include measuring joint state values and cylinder pressure values of the working device during the excavation operation, and calculating the digging force exerted on the bucket from dynamic equation of the construction machinery using the joint state values and the cylinder pressure values.

In example embodiments, calculating the digging force may be performed by using a control technique performed based on a Momentum-based Disturbance Observer.

In example embodiments, the joint state values may include an angle and an angular velocity of each of joints of a boom, an arm and the bucket, and the cylinder pressure valves may include pressure values of a boom cylinder, an arm cylinder and a bucket cylinder.

In example embodiments, generating the new second excavation trajectory based on the calculated digging force may include performing a pre-learned prediction algorithm.

In example embodiments, performing the pre-learned prediction algorithm may include performing an algorithm trained by using the digging force and topographic data of the work area as training data for estimating the second excavation trajectory.

In example embodiments, the algorithm may be a learning algorithm based on Dynamic Movement Primitives (DMP) set as a critical dynamics model.

In example embodiments, generating the second excavation trajectory based on the digging force may include generating the second excavation trajectory to reduce an excavation speed and excavation depth when the digging force exceeds a preset value.

In example embodiments, the second excavation trajectory may include joint angle values over time of a boom, an arm and the bucket.

According to example embodiments, a control system for construction machinery includes a measurement portion configured to measure joint state values and cylinder pressure values of a working device of the construction machinery, a control device configured to output a control signal for performing an automated excavation operation, the control device configured to calculate a digging force exerted on a bucket during an excavation operation according to a first excavation trajectory, generate a new second excavation trajectory based on the calculated digging force and to output a control signal for the second excavation trajectory, and a work control device configured to move the bucket according to the control signal for the second excavation trajectory.

In example embodiments, the measurement portion may include a plurality of sensors for measuring an angle and an angular velocity of each of joints of a boom, an arm and the bucket, and pressure values of a boom cylinder, an arm cylinder and a bucket cylinder.

In example embodiments, the control device may include a digging force estimator configured to calculate the digging force exerted on the bucket from dynamic equation of the construction machinery using the joint state values and the cylinder pressure values, and a trajectory generator configured to generate the second excavation trajectory based on the calculated digging force.

In example embodiments, the digging force estimator may calculate the digging force by using a control technique performed based on a Momentum-based Disturbance Observer.

In example embodiments, the control device may receive topographic data of a work area, and the trajectory generator may perform an algorithm trained by using the digging force and the topographic data of the work area as training data for estimating the second excavation trajectory.

In example embodiments, the algorithm may be a learning algorithm based on Dynamic Movement Primitives (DMP) that set the second excavation trajectory as a critical dynamics model.

In example embodiments, the control device may generate the second excavation trajectory to reduce an excavation speed and excavation depth when the digging force exceeds a preset value.

According to example embodiments, a control device for construction machinery may estimate a digging force applied to a bucket when performing an automated excavation operation according to a preset first excavation trajectory, and may generate a new second excavation trajectory based on the estimated digging force.

An excavation work according to the second excavation trajectory may prevent excessive pressure from being applied to a hydraulic pump, a boom cylinder, an arm cylinder and a bucket cylinder, and may prevent the bucket from being stuck in the ground when the bucket is working. Thus, fuel economy and durability of the construction machinery may be improved and work efficiency may be improved.

BRIEF DESCRIPTION OF THE DRAWINGS

Example embodiments will be more clearly understood from the following detailed description taken in conjunction with the accompanying drawings.

DETAILED DESCRIPTION OF EXAMPLE EMBODIMENTS

Hereinafter, example embodiments of the present invention will be explained in detail with reference to the accompanying drawings.

In the drawings, the sizes and relative sizes of components or elements may be exaggerated for clarity.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments may, however, be embodied in many different forms and should not be construed as limited to example embodiments set forth herein. Rather, these example embodiments are provided so that this disclosure will be thorough and complete, and will fully convey the scope of example embodiments to those skilled in the art.

Figure 1:
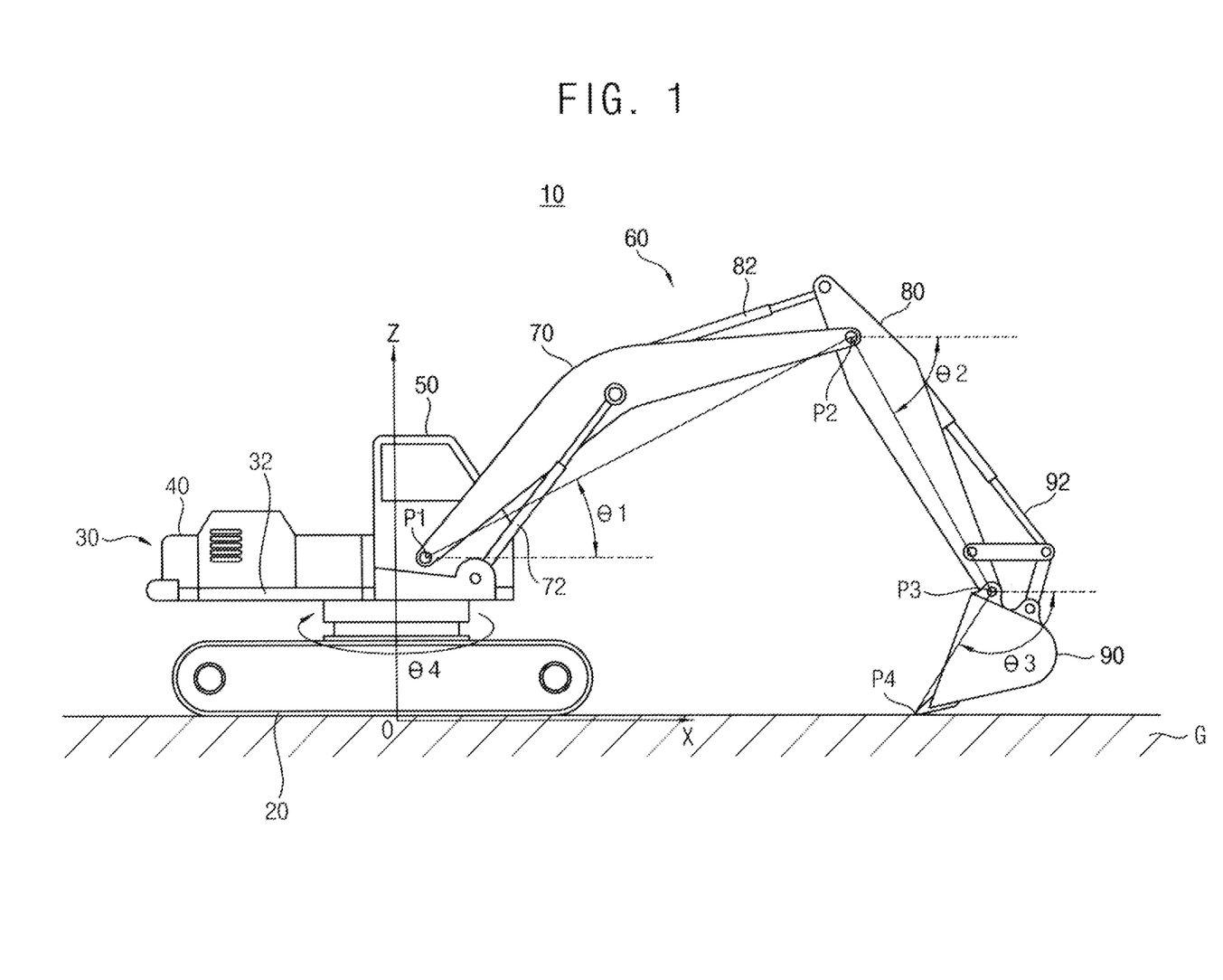
FIG. 1 is a side view illustrating construction machinery in accordance with example embodiments.
Figure 2:
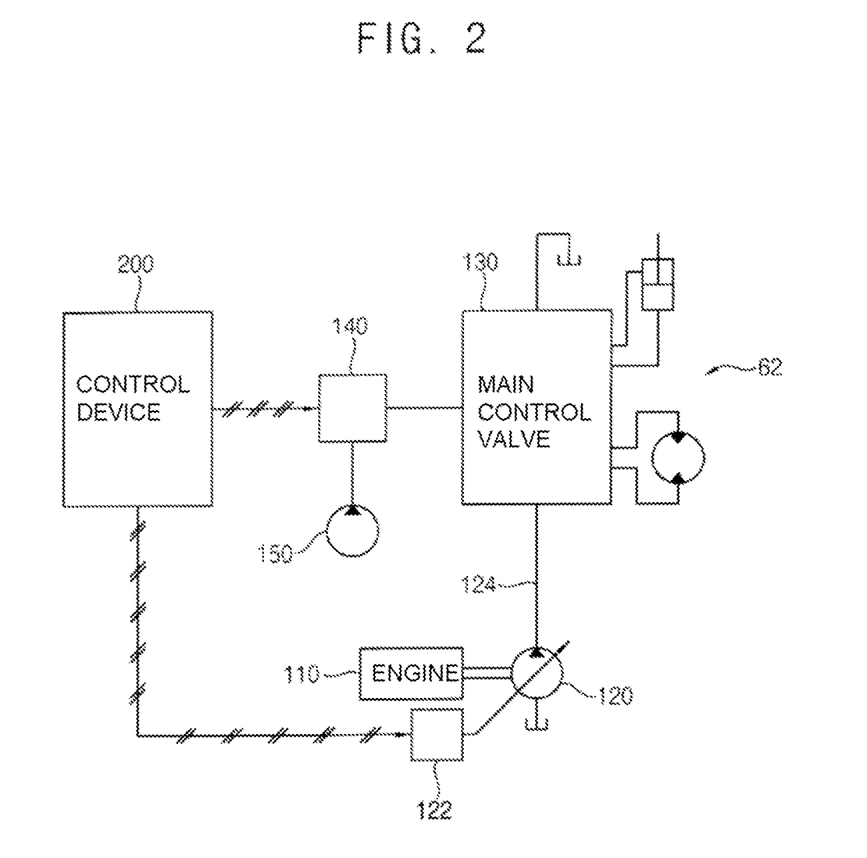
FIG. 2 is a block diagram illustrating a hydraulic control system for construction machinery in FIG. 1.

FIG. 1 is a side view illustrating construction machinery in accordance with example embodiments. FIG. 2 is a block diagram illustrating a hydraulic control system for construction machinery in FIG. 1.

Referring to FIGS. 1 and 2, construction machinery 10 may include a lower travelling body 20, an upper swinging body 30 mounted to be capable of swinging on the lower travelling body 20, and a cabin 50 and a front working device 60 installed in the upper swinging body 30.

The lower traveling body 20 may support the upper swinging body 30 and may travel the construction machinery 10 such as an excavator using power generated from an engine 110. The lower traveling body 20 may be a caterpillar type traveling body including a caterpillar track. Alternatively, the lower traveling body 20 may be a wheel type traveling body including traveling wheels. The upper swinging body 30 may have an upper frame 32 as a base, and may rotate on a plane parallel to the ground on the lower traveling body 20 to set a working direction.

The cabin 50 may be installed on a left front side of the upper frame 32, and the working device 60 may be mounted on a front side of the upper frame 32. A counter weight 40 may be mounted at a rear of the upper frame 32, to stabilize the construction machinery by equilibrating an external force when the construction machinery performs the work of raising the load upward.

The front working device 60 may include a boom 70, an arm 80 and a bucket 90. The front working device 60 may be actuated by driving actuators such as a boom cylinder 72, an arm cylinder 82 and a bucket cylinder 92. In particular, the boom cylinder 72 for controlling a movement of the boom 70 may be installed between the boom 70 and the upper swinging body 30. The arm cylinder 82 for controlling a movement of the arm 80 may be installed between the arm 80 and the boom 70. The bucket cylinder 92 for controlling a movement of the bucket 90 may be installed between the bucket 90 and the arm 80. Additionally, a swing motor for controlling the upper swinging body 30 may be installed between the upper swinging body 30 and the lower travelling body 20. As the boom cylinder 72, the arm cylinder 82 and the bucket cylinder 92 expand or contract, the boom 70, the arm 80 and the bucket 90 may implement various movements, to thereby perform various works. Here, the boom cylinder 72, the arm cylinder 82 and the bucket cylinder 92 may be extended or contracted by a working oil supplied from a hydraulic pump 120.

Meanwhile, in addition to the bucket 90, various attachments may be attached to an end portion of the arm 80 according to the purpose of the work. For example, the bucket may be used for excavation or ground leveling, and a breaker (not illustrated) may be used to crush rocks or the like. In addition, a cutter may be used to cut scrap metal or the like.

As illustrated in FIG. 2, a hydraulic control system for construction machinery may include the engine 110, the hydraulic pump 120 driven by the engine 110, at least one actuator 62 operable by the hydraulic oil discharged from the hydraulic pump 120, a main control valve 130 including at least one control valve installed between the hydraulic pump 120 and the actuator 62 to control an amount of the working oil supplied to the actuator 62, and a spool displacement adjusting portion 140 including a spool displacement adjusting valve configured to supply a pilot signal pressure to a spool of the control valve in proportion to an inputted control signal.

In example embodiments, the construction machinery may include an excavator, a wheel loader, a forklift, etc. Hereinafter, it will be explained that example embodiments may be applied to the excavator. However, it may not be limited thereto, and it may be understood that example embodiments may be applied to other construction machinery such as the wheel loader, the forklift, etc.

The hydraulic pump 120 may be connected to an output shaft of the engine 110 as a mechanical drive part. For example, the hydraulic pump 120 may include a pressure control type electronic hydraulic pump. A discharge amount of the hydraulic pump 120 may be determined by a swash plate angle. A pump regulator 122 may adjust the angle of the swash plate of the hydraulic pump 120 according to the inputted pilot pressure. An electronic proportional pressure reducing valve 142 may control the pilot pressure inputted to the pump regulator 122. The pump regulator 122 may be connected to a pilot pump 150 via the electronic proportional pressure reducing valve 142. Accordingly, when a pump control signal as a current command value from a control device 200 is inputted to the electronic proportional pressure reducing valve 142, the electronic proportional pressure reducing valve 142 may output the pilot pressure proportional to the pump control signal to the pump regulator 122, and the pump regulator 122 may adjust the angle of the swash plate of the hydraulic pump 120 according to the inputted pilot pressure.

The hydraulic pump 120 may be connected to the main control valve 130 through a high-pressure hydraulic line 124. The actuator 62 such as the boom cylinder 72, the arm cylinder 82, the bucket cylinder 92, a travel motor, etc. may be connected to the main control valve 130 through a high-pressure hydraulic line.

The pilot pump 150 may be connected to the output shaft of the engine 100. As the output shaft of the engine rotates, the pilot pump 150 may be driven to discharge a pilot working oil. For example, the pilot pump may include a gear pump. In this case, the working oil and the pilot working oil may include substantially the same material.

The pilot working oil discharged from the pilot pump 150 may be supplied to the spool of the control valve via the spool displacement adjusting valves 410, 420 respectively. The pilot working oil discharged from the pilot pump 400 may be supplied to the first and second spool displacement adjusting valves 410, 420 through a control line 402.

For example, a pair of the spool displacement adjusting valves may be provided in both sides of the spool of the corresponding control valve. A pilot signal pressure outputted from the spool displacement adjusting valve may be supplied selectively to both sides of the spool, to switch the control valve. The spool displacement adjusting valve may supply the pilot signal pressure in proportion to the inputted control signal. The movement of the spool of the control valve may be controlled by the pilot signal pressure. That is, the movement direction of the spool may be determined by a supply direction of the pilot signal pressure, and the displacement amount of the spool may be determined by the magnitude of the pilot signal pressure.

For example, the main control valve as an assembly including the control valve may be an electro-hydraulic main control valve. The spool displacement adjusting valve may include an electro proportional pressure reducing valve (EPPRV) which controls a pilot working oil supplied to the spool of the control valve according to an inputted electrical signal.

Accordingly, the spool displacement adjusting portion 140 for controlling the amount of the displacement of the spool of the control valve of the main control valve 130 in proportion to the input control signal may be provided as a work control device for controlling the working device 60.

In example embodiments, the control device 200 may calculate an optimal excavation trajectory for an autonomous excavator and output a pressure command signal as a control signal for operating the working device 60 according to the calculated excavation trajectory to the spool displacement adjusting valve. The electro proportional pressure reducing valve may output a secondary pressure in proportion to the pressure command signal to the corresponding spool, to control the spool using the electrical control signal.

Referring again to FIG. 1, in a three-dimensional orthogonal coordinate system used in the control method according to example embodiments, the Z-axis may correspond to a swing axis of the upper swinging body, and the original point O may correspond to an intersection of the swing axis and an installation surface of the construction machinery 10. Additionally, the X-axis orthogonal to the Z-axis may extend in an extending direction of the front working device 60.

An attaching position of the boom 70 with respect to the upper swinging body 30 may be represented by a boom joint position P1, which is a position of a boom pin as a boom rotation axis. Similarly, an attaching position of the arm 80 with respect to the boom 70 may be represented by an arm joint position P2, which is a position of an arm pin as an arm rotation axis. An attaching position of the bucket 90 with respect to the arm 80 may be represented by a bucket joint position P3, which is a position of a bucket rotation axis. Additionally, an end position of the bucket 90 may be represented by a bucket tip position P4.

An angle formed between a line segment connecting the boom joint position P1 and the arm joint position P2 and a horizontal plane may be represented by a boom rotation angle $\theta 1$, an angle formed between a line segment connecting the arm joint position P2 and the bucket joint position P3 and the horizontal plane may be represented by an arm rotation angle $\theta 2$, and an angle formed between a line segment connecting the bucket joint position P3 and the bucket tip position P4 and the horizontal plane may be represented by an bucket rotation angle $\theta 3$.

Because the coordinate value of the boom pin position P1 is a fixed value, if the boom rotation angle $\theta 1$, the arm rotation angle $\theta 2$ and the bucket rotation angle $\theta 3$ are determined, the coordinate value of the bucket tip position P4 may be uniquely determined. As described later, a trajectory of the bucket tip position P4 may be referred to as the excavation trajectory, and the excavation trajectory may be determined by the boom rotation angle θ1, the arm rotation angle θ2, and the bucket rotation angle θ3. For example, the boom rotation angle θ1, the arm rotation angle θ2, and the bucket rotation angle θ3 may be measured by angle sensors installed at the boom joint position P1, the arm joint position P and the bucket joint position P3 respectively.

Hereinafter, a control system for controlling the construction machinery will be explained.

Figure 3:
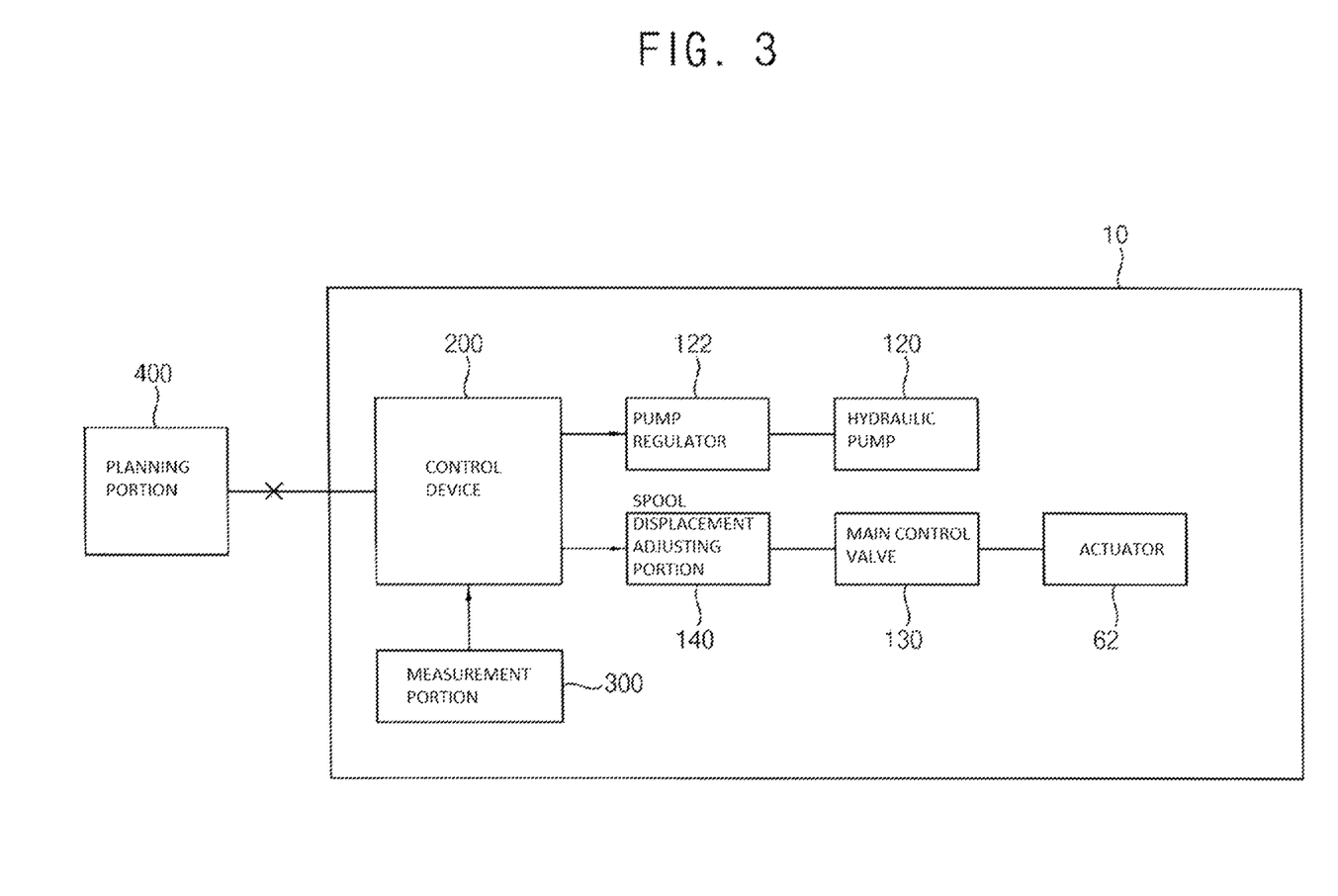
FIG. 3 is a block diagram illustrating a control system for construction machinery in accordance with example embodiments.
Figure 4:
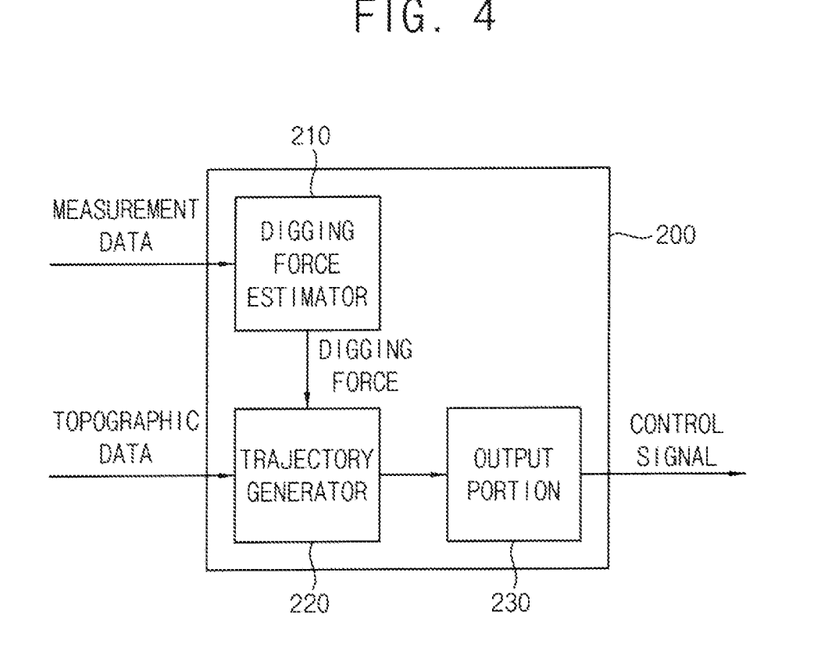
FIG. 4 is a block diagram illustrating a control device in FIG. 3.
Figure 5:
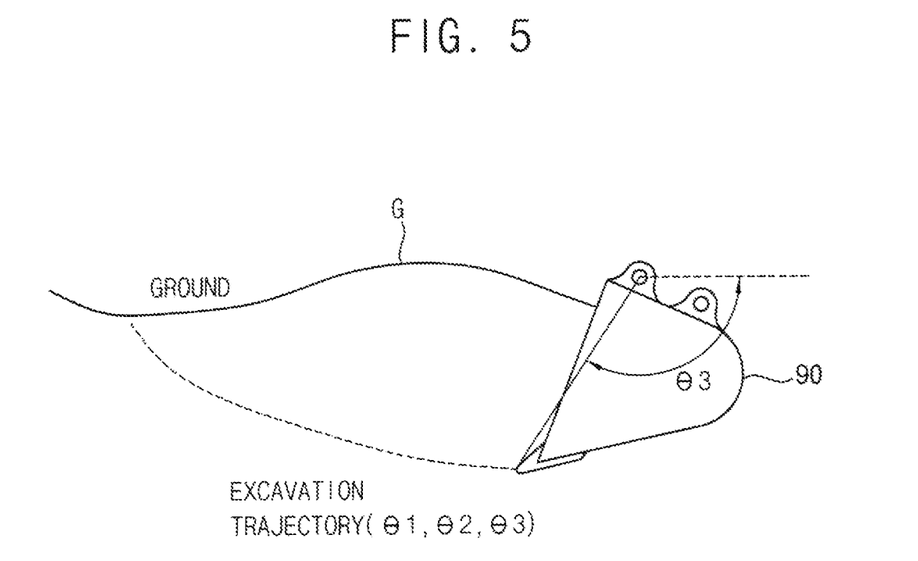
FIG. 5 is a view illustrating an excavation trajectory of a bucket moving according to a control signal from the control device in FIG. 4.
Figure 6:
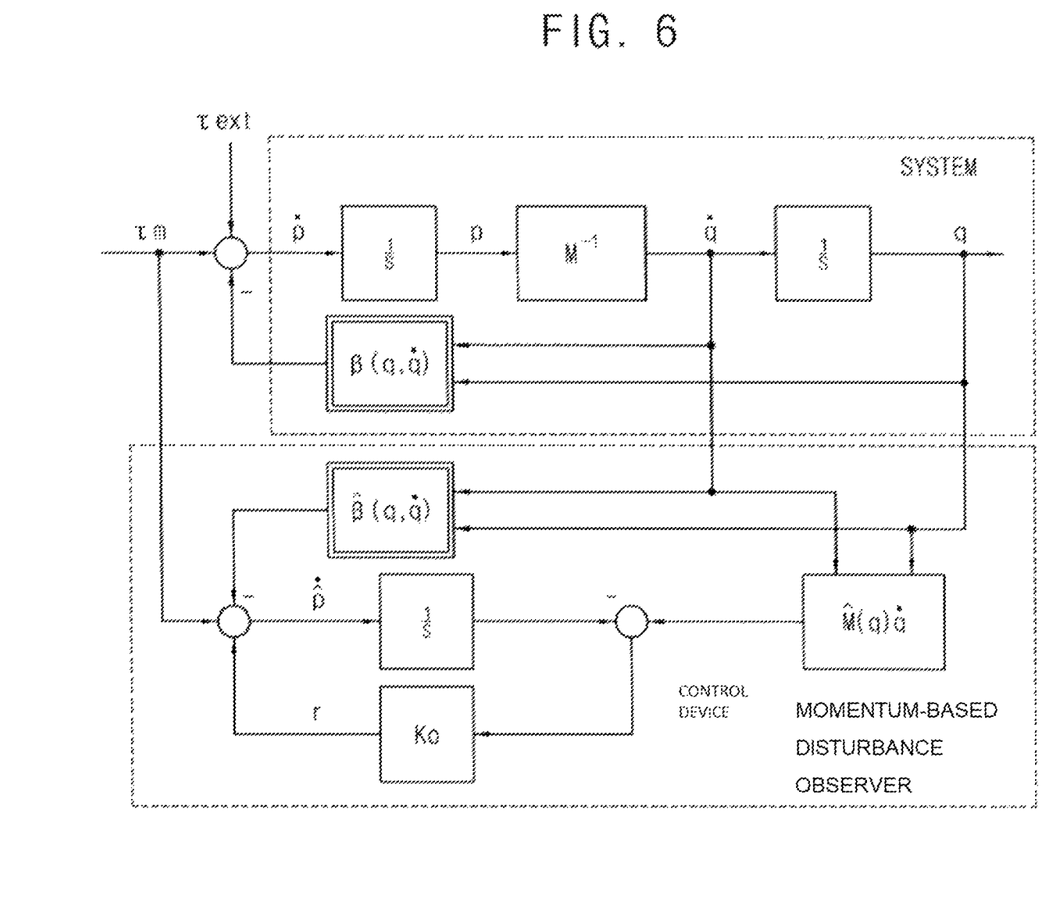
FIG. 6 is a block diagram illustrating a disturbance observer control model performed by a digging force estimator in FIG. 4.
Figure 7:
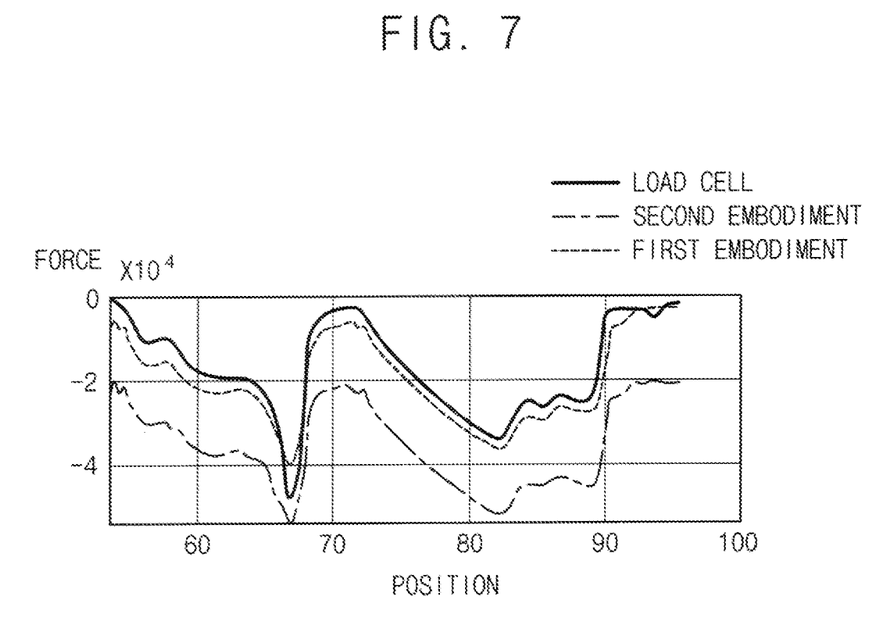
FIG. 7 is graphs illustrating digging forces calculated by the digging force estimator in FIG. 4 and a digging force using a load cell.
Figure 8:
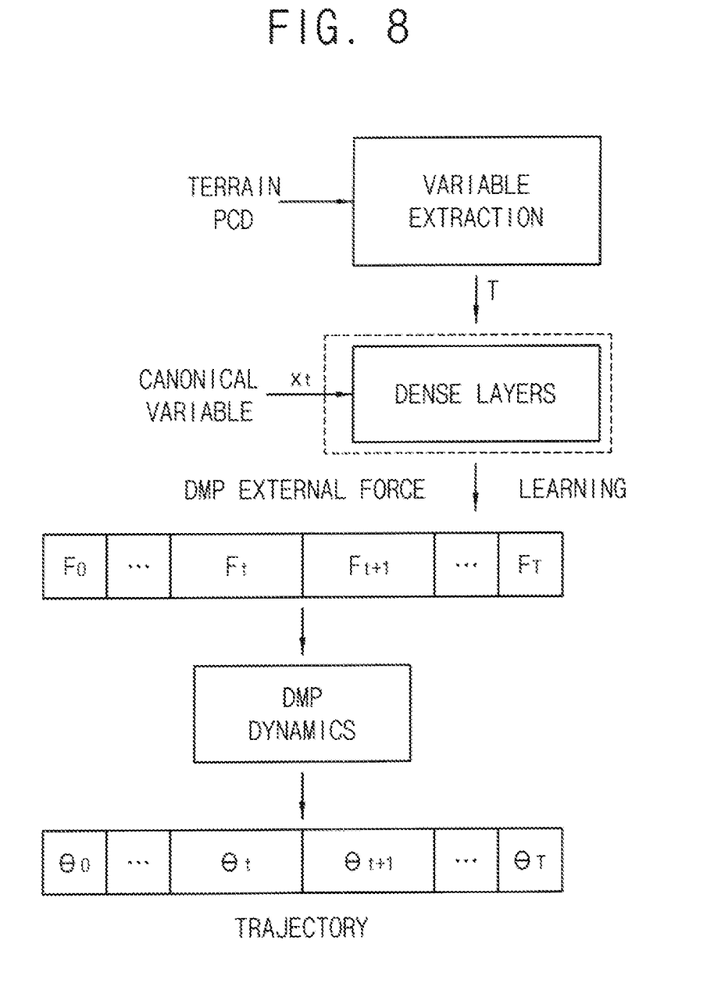
FIG. 8 is a view illustrating a DMP-based imitative learning performed by a trajectory generator in FIG. 4.
Figure 9:
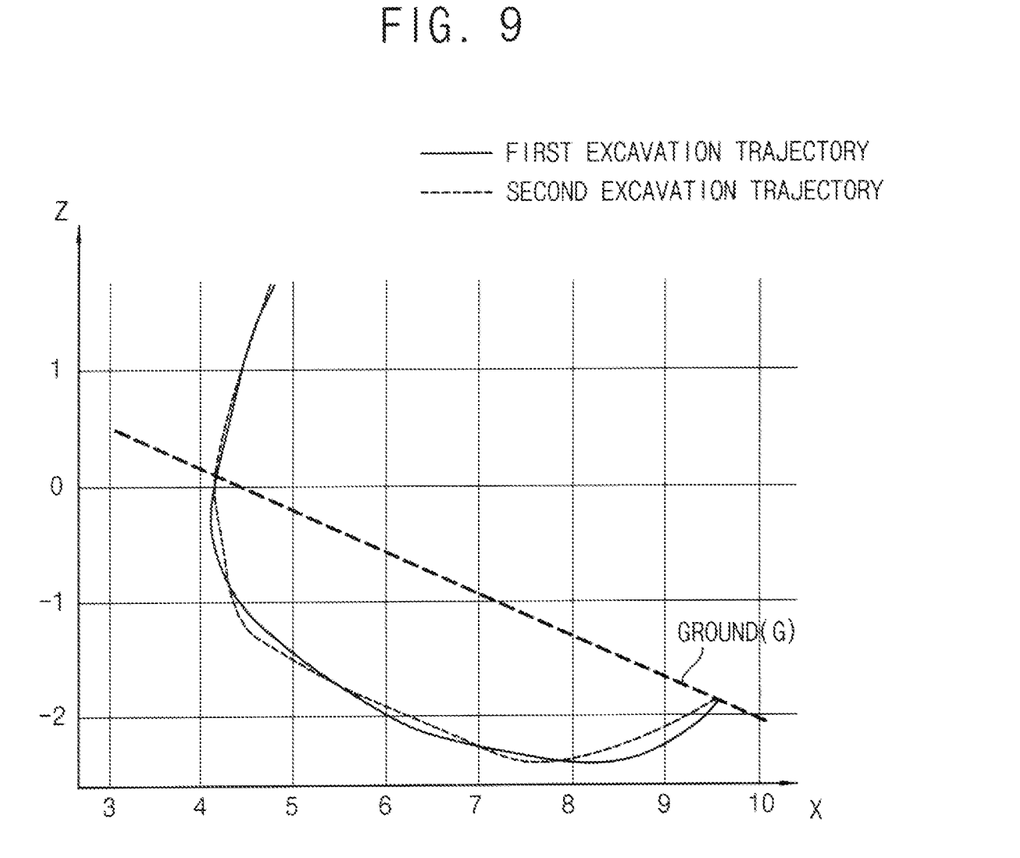
FIG. 9 is graphs illustrating an excavation trajectory generated in the trajectory generator in FIG. 4 and an excavation trajectory generated in a comparative embodiment.

FIG. 3 is a block diagram illustrating a control system for construction machinery in accordance with example embodiments. FIG. 4 is a block diagram illustrating a control device in FIG. 3. FIG. 5 is a view illustrating an excavation trajectory of a bucket moving according to a control signal from the control device in FIG. 4. FIG. 6 is a block diagram illustrating a disturbance observer control model performed by a digging force estimator in FIG. 4. FIG. 7 is graphs illustrating digging forces calculated by the digging force estimator in FIG. 4 and a digging force using a load cell. FIG. 8 is a view illustrating a DMP-based imitative learning performed by a trajectory generator in FIG. 4. FIG. 9 is graphs illustrating an excavation trajectory generated in the trajectory generator in FIG. 4 and an excavation trajectory generated in a comparative embodiment.

Referring to FIGS. 3 to 9, a control system for construction machinery may include a measurement portion 300 configured to measure joint state values and cylinder pressure values of a working device 60 of construction machinery, a control device 200 configured to control an automated excavation work of the construction machinery, and a work control device configured to control operations of the working device 60. Additionally, the control system for construction machinery may further include a planning portion 400 configured to provide topographic information of a work terrain and work information (work type) for an automated work of the construction machine.

In example embodiments, the measurement portion 300 may include a plurality of sensors for measuring an angle and an angular velocity of each of joints of the boom 70, the arm 80 and the bucket 90, and pressure values of the boom cylinder 72, the arm cylinder 82 and the bucket cylinder 92.

For example, angle sensors and IMU (Inertia Measurement Unit) sensors may measure an angle value, an angular velocity value, and an angular acceleration value of each of the joints of the boom 70, arm 80 and bucket 90. A pressure sensor may measure pressure values of the boom cylinder 72, the arm cylinder 82 and the bucket cylinder 92.

In addition, the measurement portion 300 may include sensors for acquiring topographic information of a work area in which an automated work such as excavation work, trench work, grading work, etc. is performed. For example, the sensors may include a LiDAR sensor, a stereo camera sensor, a Radar sensor, an ultrasonic sensor, etc. The sensor may scan the work area to obtain shape information data in front of the excavator. The sensor may output point cloud data (PCD) information to the control device 300. The PCD may be data representing the topography of the measured area as points having coordinate values.

In example embodiments, the control device 200 of the construction machinery may receive topographic information of a work area and work information for an automated excavation work from the planning portion 400. The work area may be defined as an area for the excavator to move and work. The work information may include command information on a moving path and work path of the excavator. The control device 200 may receive the command information on the moving path and the work path, and may move the excavator according to the moving path and the work path. The control device 200 may determine an area, a volume, or a path (work plan) to be worked on based on the topographic data of the work area and the work information. The control device 200 may output a control signal for executing the determined work plan. The control device 200 may generate and output a control signal corresponding to joint angle values over time of the boom, the arm and the bucket.

The planning portion 400 may collect coordinate information including latitude, longitude, and altitude for a plurality of points in the work area using a GNSS rover, which is a kind of satellite signal receiver, to obtain raw data for the work area. Alternatively, topographic information of the work area may be obtained through various known methods such as aerial photography. The planning portion 400 may collect and process the topographic information and provide it to the control device 200 of the construction machinery in the form of point cloud data (PCD).

The control device 200 of the construction machinery may be wirelessly connected to the planning portion 400. For example, the construction machinery 10 may include a wireless transceiver for wireless communication with the planning portion 400. The wireless transceiver may use a known communication standard such as cellular communication such as CDMA and GSM, Wi-Fi, and radio communication.

In example embodiments, the control device 200 of the construction machinery may calculate a digging force exerted on the bucket 90 during an excavation operation according to a first excavation trajectory, generate a new second excavation trajectory based on the calculated digging force, and output a control signal for the second excavation trajectory. The control device 200 of the construction machinery may include a digging force estimator 210, a trajectory generator 220 and an output unit 230.

The digging force estimator 210 may calculate the digging force applied to the bucket 90 from dynamic equation of the construction machinery using the joint state values and the cylinder pressure values. The trajectory generator 220 may generate the second excavation trajectory based on the calculated digging force. The digging force estimator 210 and the trajectory generator 220 may be implemented with dedicated hardware, software, and circuitry configured to perform the functions described herein. These elements may be physically implemented by electronic circuits such as logic circuits, discrete components, microprocessors, hard-wired circuits, memory elements, wiring connections, and the like.

As illustrated in FIG. 5, the bucket 90 may perform a digging work according to an initial excavation trajectory (a first excavation trajectory). The boom rotation angle θ1, the arm rotation angle θ2 and the bucket rotation angle θ3 over time may form the excavation trajectory. The initial excavation trajectory (the first excavation trajectory) may be determined in consideration of only the work topography and kinematic constraint requirements. As described later, the trajectory generator 220 may generate the initial excavation trajectory by performing a pre-learned prediction algorithm (machine learning algorithm). For example, the initial excavation trajectory (the first excavation trajectory) may be generated by using parameters extracted from the terrain data of the work area and initial joint state values as input data.

When the bucket 90 moves according to the first excavation trajectory, when there is an unrecognizable obstacle/underground object on the excavation trajectory path, a load (i.e., digging force) may be applied to the end of the bucket 90. Such a load may cause excessive pressure in the hydraulic pump 120 and the actuator, thereby reducing excavation efficiency. The control device 200 of the construction machinery may estimate such a digging force and generate a new excavation trajectory (a second excavation trajectory) based on the digging force, thereby improving the efficiency of the automated excavation operation.

In example embodiments, the digging force estimator 210 may receive measurement data of the joint state values and the cylinder pressure values from the measurement portion 300 and calculate the digging force exerted on the bucket 90 from the dynamic equation of the construction machinery. The excavator dynamics equation may be expressed as a following Equation (1).

$$M\ddot{q}+C\dot{q}+g=\tau_u+\tau_\mu+\tau_e \quad \text{Equation (1)}$$

Here, q, q', q" are the angle, angular velocity, and angular acceleration of the joint, M is the inertial matrix, C is the Coriolis and centrifugal terms, g is the gravitational term, and $\tau_u$ is the torque due to the actuator, $\tau_\mu$ is the torque due to frictional force, and $\tau_e$ is the torque due to external force.

The torque ($\tau_u$) due to the actuator may be calculated from pressure values of the boom cylinder 72, the arm cylinder 82 and the bucket cylinder 92, and the torque ($\tau_\mu$) due to the frictional force may be calculated from experimental data.

The torque ($\tau_e$) due to the external force may correspond to the digging force exerted on the bucket 90, and may be calculated by using a control technique performed based on a Momentum-based Disturbance Observer, as illustrated in FIG. 6. By the control model of the disturbance observer DOB, the observer output r ($\tau_e$) may be calculated by a following equation (2).

$$r=K_0(p(t)-\int_0^\tau(\tau_u+\tau_\mu-\hat{N}+r)ds-p(0)) \quad \text{Equation (2)}$$

Here, p(t)=M q', N=g−$C^T$q', $K_0$ is an observer gain value, N is the same value as β in FIG. 6, and the sum of $\tau_u$ and $\tau_\mu$ is the same as $\tau_m$ in FIG. 6.

In order to solve the inaccuracy of parameters such as the excavator's mass and center of mass, parameter identification may be performed using information obtained from a load cell.

As illustrated in FIG. 7, a verification procedure in which the estimated digging force according to a first embodiment is compared with the force measured by the load cell may be performed.

The trajectory generator 220 may generate a new second excavation trajectory in real time based on the calculated digging force and the topographic data of the work area. The trajectory generator 220 may perform an algorithm trained by using the digging force and terrain data (terrain PCD) as training data. The algorithm may be a learning algorithm based on Dynamic Movement Primitives (DMP) set as a critical dynamics model.

As illustrated in FIG. 8, in order to create a trajectory capable of responding to changes in the environment, the entire path may be set as a critical damped system. A nonlinear function that outputs an external force model with a variable (function) representing the characteristics of the external environment as input may be created by learning through a Gaussian mixture model or a neural network.

The entire path may be expressed as a function of a phase canonical dynamics variable in the form of a monotonic function, not time. When the calculated digging force exceeds a preset value (threshold value), in order to reduce this, the trajectory may be regenerated to reduce an excavation speed and excavation depth.

In this case, the DMP dynamics model may be expressed by a following equation (3), and the canonical system may be expressed by a following equation (4).

$$\tau\ddot{y}=\alpha_y(\beta_y(g-y)-\dot{y})+f(x) \quad \text{Equation (3)}$$

$$\tau\dot{x}=-\alpha_x x \quad \text{Equation (4)}$$

FIG. 9 represents a graph of the first excavation trajectory and a graph of the second excavation trajectory generated based on the estimated digging force. The second excavation trajectory may be generated to reduce the excavation speed and the excavation depth when the estimated digging force exceeds a preset value. The excavation operation according to the second excavation trajectory may prevent excessive pressure from being applied to the hydraulic pump 120 and the actuator 62, and may prevent the bucket 90 from being stuck in the ground during operation.

The output portion 230 may output a control signal for the second excavation trajectory. The output portion 230 may generate a control signal corresponding to the joint angle values of the boom, the arm and the bucket over time, for example, generate and apply a current to the spool displacement adjusting valves of the spool displacement adjusting portion 140. The spool displacement adjustment valves may supply a pilot signal pressure proportional to the intensity of the applied current to the spools of the corresponding control valve 130 to move the spools according to the intensity of the applied pilot signal pressure.

Thus, the actuators 62 such as the boom cylinder 72, the arm cylinder 82 and the bucket cylinder 92 may be driven by the control valve in response to the control signal, so that the tip of the bucket 90 moves along the second excavation trajectory to perform the excavation operation.

Additionally, the digging force estimator 210 may newly calculate a digging force applied to the bucket 90 in real time when the bucket 90 moves along the generated second excavation trajectory, and the trajectory generator 220 may generate a new third excavation trajectory in real time based on the newly calculated digging force and the terrain data of the work area. Thus, the tip of the bucket 90 may be moved along the third excavation trajectory to continue the excavation operation.

As mentioned above, the control device 200 of the construction machinery may estimate the digging force applied to the bucket 90 when performing an automated excavation operation according to a preset first excavation trajectory, and may generate a new second excavation trajectory based on the estimated digging force.

The excavation work according to the second excavation trajectory may prevent excessive pressure from being applied to the hydraulic pump 120, the boom cylinder 72, the arm cylinder 82 and the bucket cylinder 92, and may prevent the bucket 90 from being stuck in the ground when the bucket 90 is working. Thus, fuel economy and durability of the construction machinery may be improved and work efficiency may be improved.

Hereinafter, a method of controlling construction machinery using the control system for construction machinery in FIG. 3 will be explained.

Figure 10:
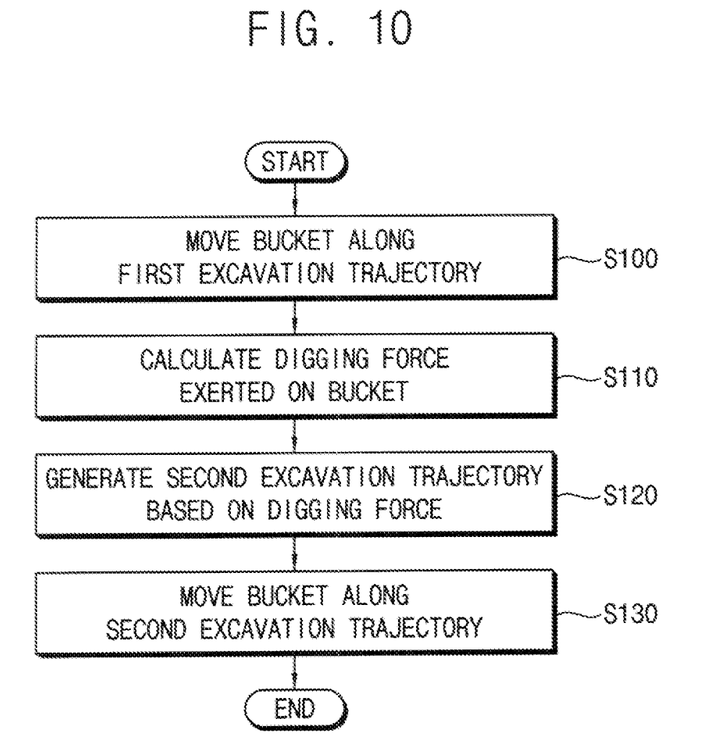
FIG. 10 is a flow chart illustrating a control method for construction machinery in accordance with example embodiments.

FIG. 10 is a flow chart illustrating a control method for construction machinery in accordance with example embodiments.

Referring to FIGS. 1 to 4 and 10, first, a bucket 90 of a working device 60 may be moved according to a preset first excavation trajectory to perform an excavation operation on the ground G of a work area (S100).

In example embodiments, a control device 200 of an autonomous excavator may receive topographic information of a work area and work information from a planning portion 400, determined a first excavation trajectory about the ground G of the work area based on the topographic information and the work information, and control a work control device to move the bucket 90 along the determined first excavation trajectory.

The first excavation trajectory may be determined in consideration of the work topography and kinematic constraint requirements. The first excavation trajectory may be implemented by joint angle values of a boom, an arm and the bucket over time.

Then, a digging force applied to the bucket 90 during the excavation operation may be calculated (S110), and a new second excavation trajectory may be generated based on the calculated digging force (S120). Then, the bucket 90 may be moved according to the second excavation trajectory to perform an excavation operation (S130).

When the bucket 90 moves according to the first excavation trajectory, when there is an unrecognizable obstacle/underground object on the excavation trajectory path, a load (i.e., digging force) may be applied to the end of the bucket 90. The control device 200 of the construction machinery may estimate such a digging force and generate a new excavation trajectory based on the digging force, thereby improving the efficiency of the automated excavation operation.

In particular, measurement data of joint state values and cylinder pressure values of the working device 60 may be obtained, and the digging force exerted on the bucket 90 may be calculated from the dynamic equation of the construction machinery. The joint state values may include an angle and an angular velocity of each of joints of the boom 70, the arm 80 and the bucket 90, and the cylinder pressure valves may include pressure values of a boom cylinder 72, an arm cylinder 82 and a bucket cylinder 92. Here, the digging force may be calculated by using a control technique performed based on a Momentum-based Disturbance Observer.

In order to solve the inaccuracy of parameters such as the excavator's mass and center of mass, parameter identification may be performed using information obtained from a load cell.

Then, the new second excavation trajectory may be generated in real time based on the calculated digging force and the topographic data of the work area. The topographic data may be obtained from the planning portion 400 in the form of point cloud data (PCD). For example, an algorithm trained by using the digging force and the topographic data (terrain PCD) as training data may be performed to generate the second excavation trajectory. Here, the algorithm may be a learning algorithm based on Dynamic Movement Primitives (DMP) set as a critical dynamics model.

The second excavation trajectory may be generated to reduce an excavation speed and excavation depth when the calculated digging force exceeds a preset value. The excavation operation according to the second excavation trajectory may prevent excessive pressure from being applied to the hydraulic pump 120, the boom cylinder 72, the arm cylinder 82 and the bucket cylinder 92 and may prevent the bucket 90 from being stuck in the ground during operation.

The foregoing is illustrative of example embodiments and is not to be construed as limiting thereof. Although a few example embodiments have been described, those skilled in the art will readily appreciate that many modifications are possible in example embodiments without materially departing from the novel teachings and advantages of the present invention. Accordingly, all such modifications are intended to be included within the scope of example embodiments as defined in the claims.

What is claimed is:

1. A method of controlling construction machinery, the method comprising:
    moving a bucket of a working device along a first excavation trajectory to perform an excavation operation on the ground of a work area;
    measuring joint state values and cylinder pressure values of the working device during the excavation operation;
    calculating a digging force exerted on the bucket during the excavation operation using the measured joint state values and the measured cylinder pressure values;
    generating a second excavation trajectory based on the calculated digging force; and
    moving the bucket along the second excavation trajectory.

2. The method of claim 1, wherein the measured joint state values include an angle and an angular velocity of each of joints of a boom, an arm and the bucket, and the measured cylinder pressure valves include pressure values of a boom cylinder, an arm cylinder and a bucket cylinder.

3. The method of claim 2, wherein the digging force is calculated based on the measured joint state values and the measured cylinder pressure values by using a Momentum-based Disturbance Observer.

4. The method of claim 1, wherein the second excavation trajectory is generated, based on the calculated digging force, by a pre-learned prediction algorithm trained by using a digging force and topographic data of the work area.

5. The method of claim 4, wherein the pre-learned algorithm is Dynamic Movement Primitives (DMP) using the second excavation trajectory as a critical dynamics model.

6. The method of claim 1, wherein the second excavation trajectory is generated, based on the digging force, by reducing by reducing an excavation speed and excavation depth from the first excavation trajectory when the digging force exceeds a preset value.

7. The method of claim 1, wherein the second excavation trajectory includes joint angle values over time of a boom, an arm and the bucket.

8. A control system for construction machinery, the system comprising:
    a measurement portion configured to measure joint state values and cylinder pressure values of a working device of the construction machinery;
    a control device configured to output a control signal for performing an automated excavation operation, wherein the control device is configured to
        calculate a digging force exerted on a bucket during an excavation operation according to a first excavation trajectory, using the measured joint state values and the measured cylinder pressure values,
        generate a second excavation trajectory based on the calculated digging force and to output a control signal for the second excavation trajectory; and
    a work control device configured to move the bucket according to the control signal for the second excavation trajectory.

9. The control system for construction machinery of claim 8, wherein the measurement portion includes a plurality of sensors for measuring an angle and an angular velocity of each of joints of a boom, an arm and the bucket, and pressure values of a boom cylinder, an arm cylinder and a bucket cylinder.

10. The control system for construction machinery of claim 8, wherein the digging force estimator calculates the digging force based on the measured joint state values and the measured cylinder pressure values by using a Momentum-based Disturbance Observer.

11. The control system for construction machinery of claim 8,
   wherein the control device receives topographic data of a work area, and
   wherein the second excavation trajectory is generated by an algorithm trained by using the digging force and the topographic data of the work area as training data.

12. The control system for construction machinery of claim 11, wherein the algorithm is Dynamic Movement Primitives (DMP) using the second excavation trajectory as a critical dynamics model.

13. The control system for construction machinery of claim 8, wherein the control device generates the second excavation trajectory, based on the digging force, by reducing an excavation speed and excavation depth from the first excavation trajectory when the digging force exceeds a preset value.

14. The control system for construction machinery of claim 8, wherein the second excavation trajectory includes joint angle values over time of a boom, an arm and the bucket of the working device.

* * * * *

UNITED STATES PATENT AND TRADEMARK OFFICE
CERTIFICATE OF CORRECTION

| | | |
|---|---|---|
| PATENT NO. | : 11,634,887 B2 | Page 1 of 1 |
| APPLICATION NO. | : 16/952599 | |
| DATED | : April 25, 2023 | |
| INVENTOR(S) | : Changmook Kim et al. | |

It is certified that error appears in the above-identified patent and that said Letters Patent is hereby corrected as shown below:

On the Title Page

In Item (73) Assignee, "DOOSAN INFRACORE CO., LTD., Incheon (KR)" should read
--DOOSAN INFRACORE CO., LTD., Incheon (KR); SEOUL NATIONAL UNIVERSITY R&DB FOUNDATION, Seoul (KR)--

Signed and Sealed this
Twentieth Day of August, 2024

Katherine Kelly Vidal
*Director of the United States Patent and Trademark Office*